May 6, 1947.  W. H. SETZ  2,420,202
TENSION TESTING MACHINE
Filed Feb. 1, 1943  4 Sheets-Sheet 1
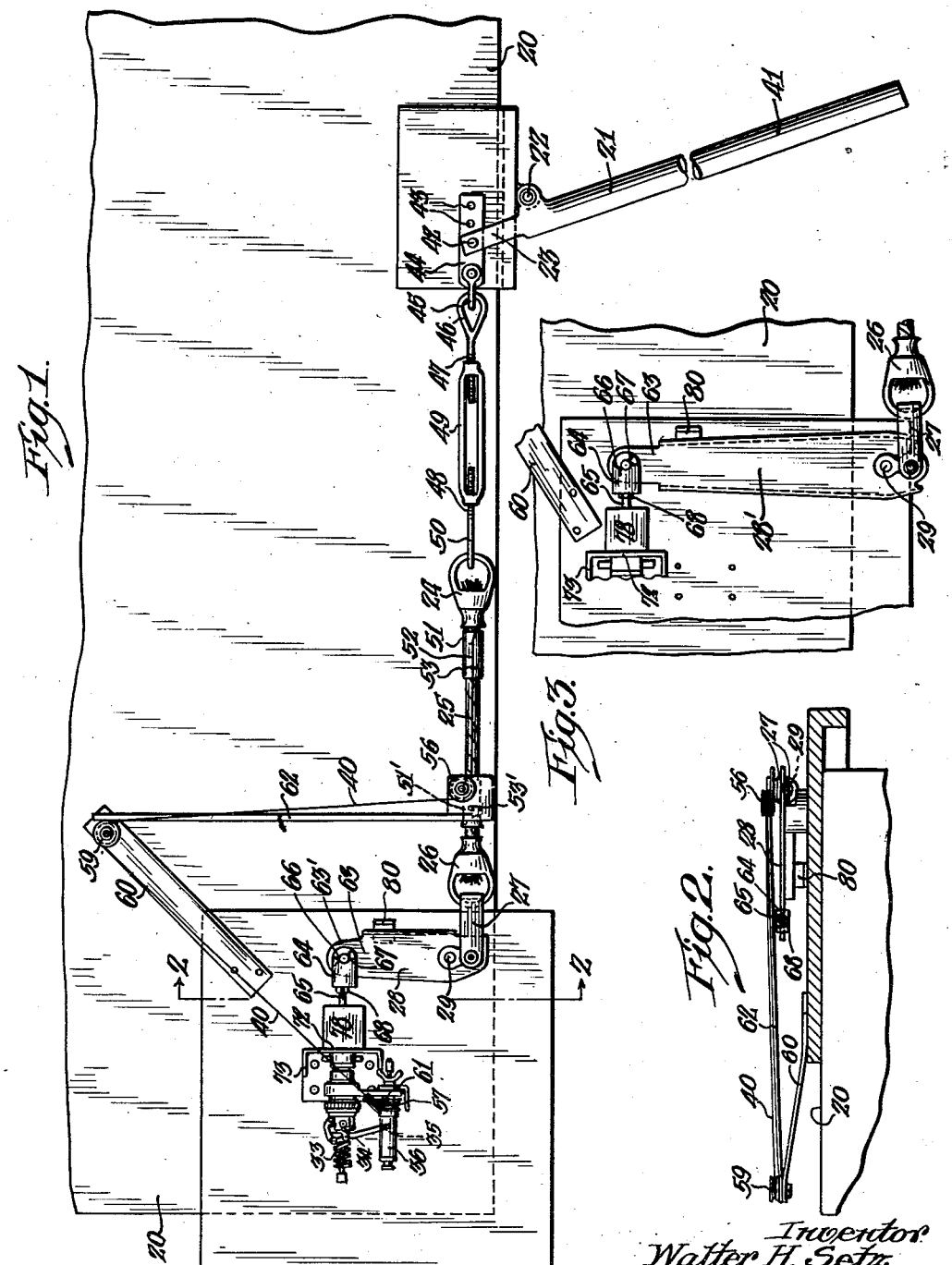
Inventor
Walter H. Setz May 6, 1947. W. H. SETZ 2,420,202
TENSION TESTING MACHINE
Filed Feb. 1, 1943 4 Sheets-Sheet 2
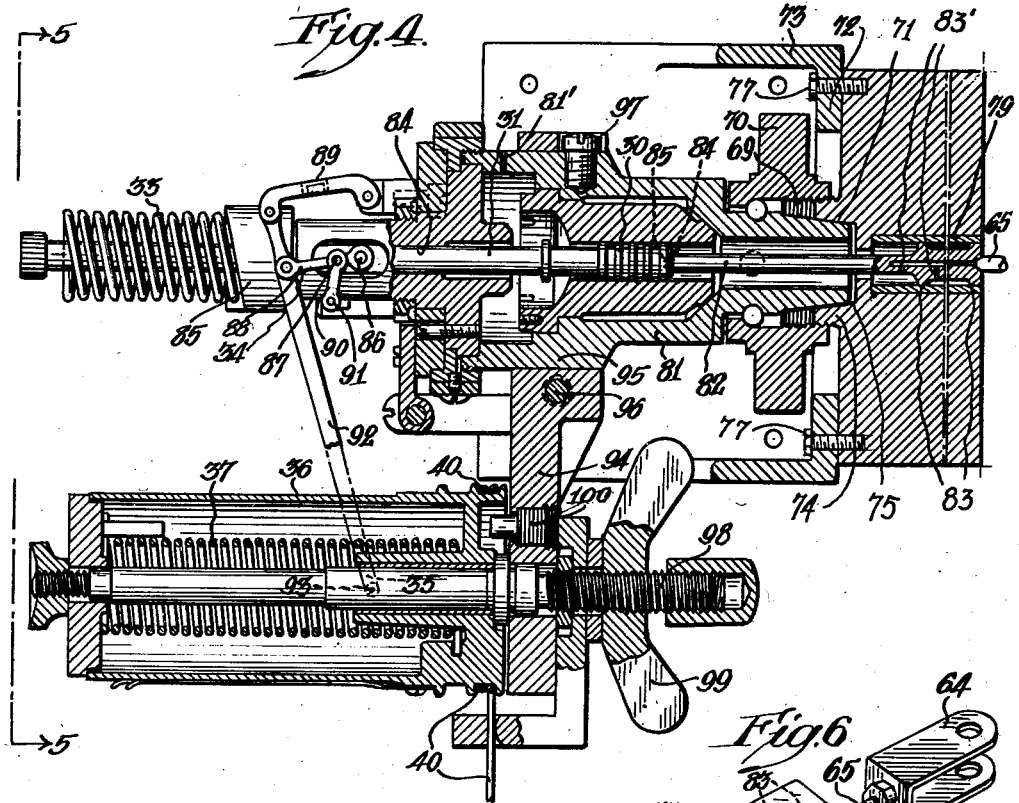
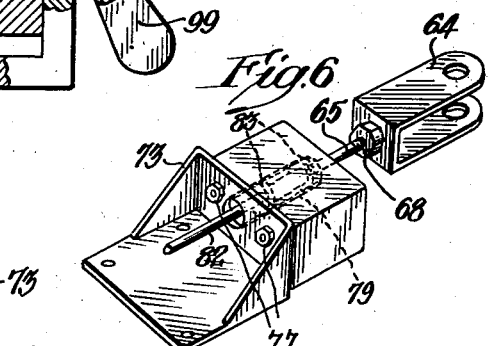
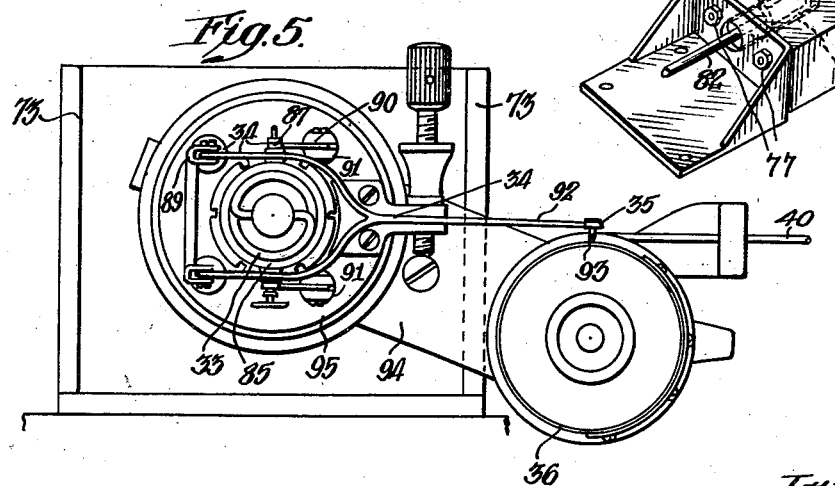
Inventor:
Walter H. Setz May 6, 1947.　　　　W. H. SETZ　　　　2,420,202
TENSION TESTING MACHINE
Filed Feb. 1, 1943　　　　4 Sheets-Sheet 3
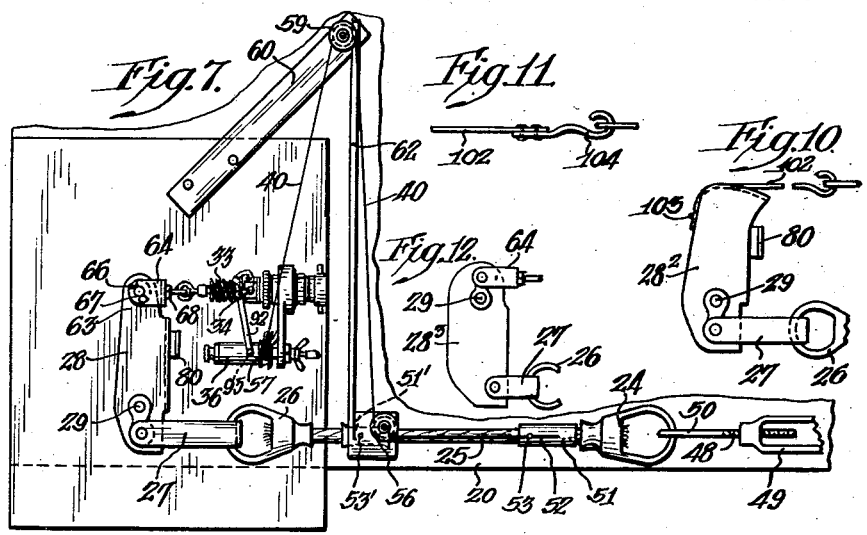
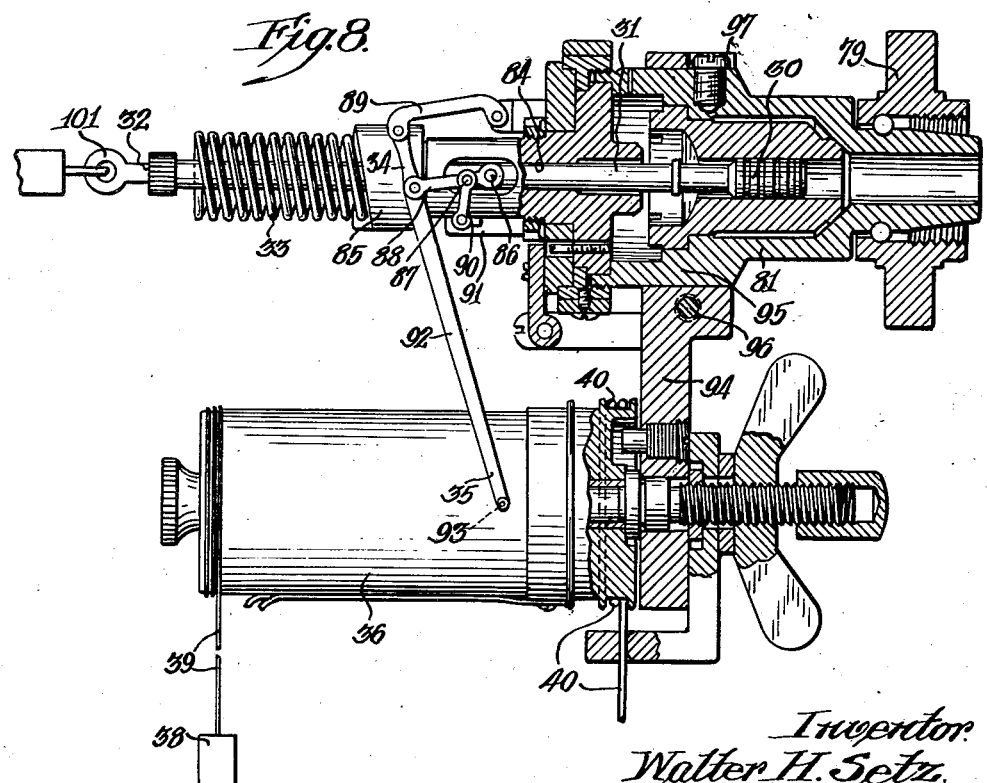
Inventor
Walter H. Setz.

May 6, 1947.　　　　W. H. SETZ　　　　2,420,202
TENSION TESTING MACHINE
Filed Feb. 1, 1943　　　　4 Sheets-Sheet 4
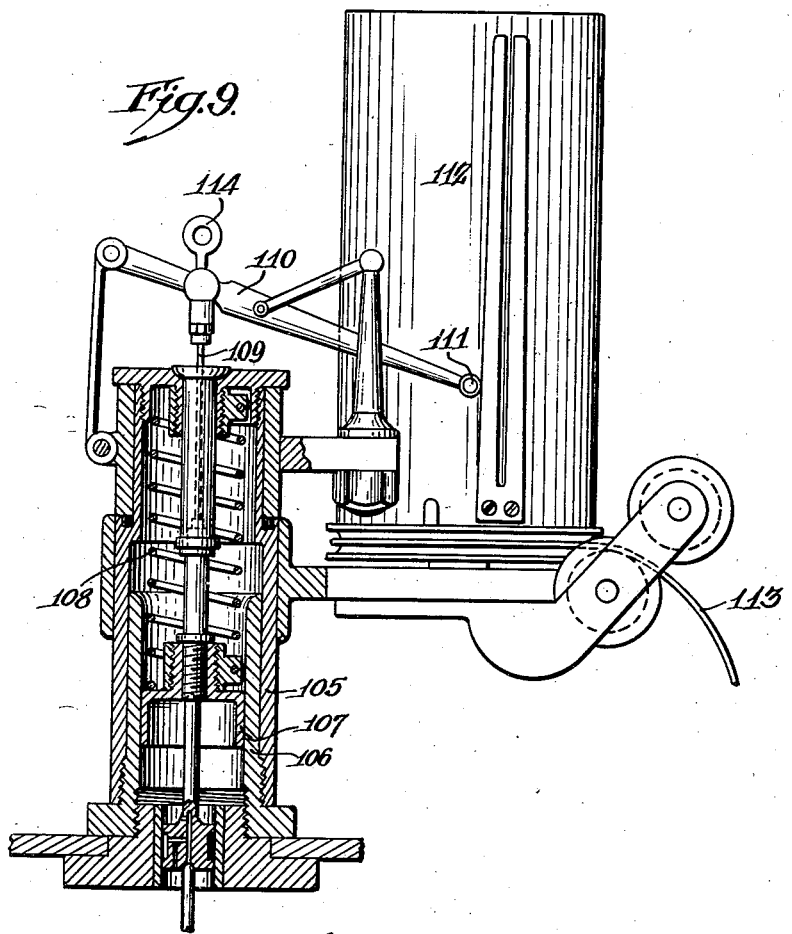
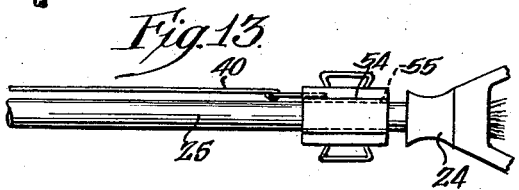
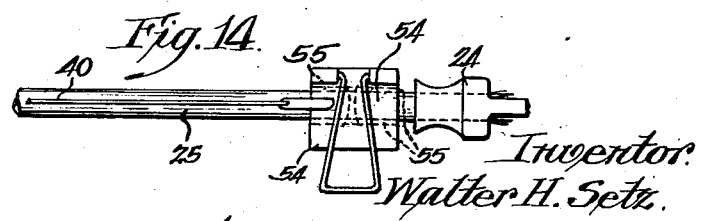
Inventor:
Walter H. Setz.
Attorneys.

Patented May 6, 1947

2,420,202

UNITED STATES PATENT OFFICE 2,420,202

TENSION TESTING MACHINE

Walter Hans Setz, Upper Darby, Pa., assignor to All American Aviation, Inc., Wilmington, Del., a corporation of Delaware Application February 1, 1943, Serial No. 474,253

12 Claims. (Cl. 73—89)

My invention relates to testing machines giving card indications of the stretch, fatigue, etc., of fabrics, cords, fibers, etc.

A purpose of the invention is to form a card record of the desired data by transmission of force for one dimension and resultant deformation for the other, through a normal engine indicator mechanism.

A further purpose is to make it possible to secure extremely accurate and at the same time permanent records of the stress-strain in any test in the form of a diagram obtained under instantaneous loading and unloading conditions.

A further purpose is to obtain accurate data on the hysteresis occurring in tensile tests of fibers, rope, etc.

A further purpose is to indicate and record stress-strain conditions and breaking strength where the tensile loads and elongations are changing rapidly.

A further purpose is to turn the drum of a normal engine indicator in proportion to the stretch of a specimen tested and to trace a record of the pull exerted upon the specimen by a stylus carried by the pencil motion and responsive to the movement of the piston rod against the indicator spring.

A further purpose is to form card indications of tensile stresses and strains corresponding to engine diagrams, using an instrument of the type of an engine indicator, applied alternatively by pushing on the piston or on the piston rod of the indicator in one application, or by pulling on the piston rod in another application.

A further purpose is to make tension diagrams corresponding in general to engine pressure diagrams, of fibers, threads, cords, rope, etc., of nylon and like material, repeating the card cycles in order to show stretch and fatigue at or between the time intervals selected.

A further purpose is to use a standard steam indicator for test purposes to indicate elongation of a specimen and the pressure required for distortion of a specimen through thrust rods connected by ball and socket contacts.

A further purpose is to provide an indicating mechanism which is particularly well suited to draw diagrams showing the tension required and the instantaneous elongation produced in tests of nylon, Fortisan, cellulose acetate butyrate, rubber hydrochloride, vinyl type plastics, etc.

Further purposes will appear in the specifications and in the claims.

I have preferred to illustrate my invention by a few forms only, selecting forms which are practical, effective and inexpensive and which well illustrate the principles involved.

Figure 1 is a largely diagrammatic view showing a test mechanism set up in position for test upon a specimen. It may be a plan or an elevation.

Figure 2 is an enlarged section of Figure 1 taken upon the line 2—2.

Figure 3 is a view showing a variation of the structure of a portion of Figure 1 with a proportioning lever having a different leverage ratio.

Figure 4 is a section of an indicator-type recording mechanism.

Figure 5 is an end view of the structure seen in Figure 4, looking in the direction of the arrows 5—5.

Figure 6 is a perspective, showing a portion of the mechanism seen in Figures 1 and 4.

Figure 7 is a diagrammatic view showing application of mechanism, corresponding generally to Figure 1, to the piston rod of an indicator by tension upon the spring end of the piston rod.

Figure 8 is an enlarged view partly in section of the indicator of Figure 7, showing the connection seen in Figure 7.

Figure 9 is a longitudinal section through a compression spring indicator.

Figures 10 and 12 are side elevations of proportioning levers which may be used.

Figure 11 is a fragmentary plan or end elevation of a band terminal seen in Figure 10.

Figure 13 is a fragmentary view of a means of attachment of a drum-rotating cord to a specimen when the elongation of the specimen is relatively large and/or the specimen will not stand much tension.

Figure 14 is a plan view of Figure 13.

In the drawing similar numerals indicate like parts.

During the development of air pick-up of mail containers it was found that the shock from pick-up of a small or relatively lightly loaded carton or sack could be taken care of by drum pay-out mechanism carried directly upon the aircraft and which yielded to the sudden tension, and by brakes which did not injure the plane nor the load.

It was realized that in picking up heavier loads and gliders, additional shock absorbing devices must be utilized to absorb excessive shock in the structure of the aircraft.

It soon became evident that the maximum load which could be picked up was limited by the ability to absorb the shock caused by overcoming the inertia of the load or glider and accelerating it to the speed of the towing aircraft.

Additional yielding tension devices as inserts in the pick-up loop or cord or the towing cable were then looked to for the purpose of giving stretch to the pick-up cord or cable, to relieve the strain until the inertia of the glider was overcome and the glider was given a speed comparable with the speed of the airplane.

As inserts within a loop or tow rope, springs and rubber cords or ropes were objectionable because, though they would stretch and stretch quickly, when they began to recover there was danger that the whole load or glider would be projected as a missile against the towing aircraft by reason of the quick "recovery" of the springs or rubber.

It then became desirable to investigate the characteristics of various fibers to see if any of them offered relief. Among others, tests were made upon various materials which will stretch but are relatively slow in recovery. In particular, tests were made upon fibers, threads, cords and ropes, of nylon and of many other materials including "Fortisan" and "Saran," as well as upon straps, strips and bands of various materials, to determine not only how much they stretch but how completely they recover, the times within which they stretch and recover and the hysteresis characteristics of the materials tested by which fatigue might affect the results.

While it was possible to find a variety of tensile testing apparatus which would indicate stress, strain and breaking strength under slow loading conditions, I was unable to find any testing apparatus in use or on sale which was adequate for producing a permanent record of stress, strain and breaking strength under instantaneous loading and unloading conditions.

With the knowledge that my invention may appear in various forms and that I cannot undertake to illustrate any considerable number of these, but with the thought that some idea of the breadth of the invention will be given by illustrating a few forms to show that the structure may widely differ in them while still well carrying out my invention, I will first describe one general layout seen in Figures 1-3 and one existing form of indicator (Figure 4), with which the results secured may be made manifest. The indicator is for my purpose considered to be a common form, the elements of which utilized by me exist in a great many indicators.

I provide testing equipment mounted upon a frame or board 20 and including an operating lever 21 pivoted at 22 and having a short lever end 23 extending beyond the pivot. The short lever 23 pulls upon one terminal 24 of a specimen 25. The lever may be operated by hand or by any suitable motor not shown or the desired force may be applied in any other suitable way.

A terminal 26 at the other end of the specimen connects through a strap 27 with what is in Figure 1 the short end of a proportioning lever 28 pivoted at 29. The opposite end of the proportioning lever exerts a pushing force upon a piston 30, or upon the piston rod 31, Figure 4. In the alternative, the same result may be secured if it exerts a pulling force on the other or spring end 32 (Figure 8), of the piston rod forming part of a fluid pressure indicator.

The pressure or tension acts against the restraint of an indicator spring 33 with the same effect as does fluid pressure upon the piston of an indicator operated by steam or other fluid, through an amplifying pencil motion 34.

It will thus be apparent that when the force is exerted on the piston rod, either directly or through the piston, the piston itself serves merely to maintain the proper alignment of the piston rod, since its functions of acting as a fluid seal are no longer required.

The pencil motion swing a writing stylus 35 over a card-supporting drum 36.

The pressure—or pull—thus performs the same indicator-operating function as does the fluid pressure in normal operation of an indicator.

Rotation of the card carrying drum 36 is effected against retardation of a spring 37 (Figure 4) or counterweight 38 and counterweight cord 39 (Figure 8) through a drum-turning cord 40 connected with the specimen in such a way as to indicate the extent of elongation of the specimen by the extent of drum rotation, in whatever position the specimen may assume during stretching.

Where the lever 21 is hand-operated, it is provided with a long operating arm 41 and a short arm 23 rigid with the long arm and by which short arm the specimen is stretched.

Various means may be used for accommodating to different lengths of specimen, two of which means are shown in Figure 1. The short end or arm 23 of the operating lever is connected with the specimen terminal 24 through pin 42, passing through a hole in the end of the lever and through any one of a plurality of holes 43 in a strap 44. This provides one adjustment. Connection of the strap with the terminal 24, by eyes 45, 46, right-and-left threaded bolts 47 and 48, with turnbuckle 49 between them, and eye 50 at the terminal 24 provides a second adjustment for length. Both adjustments affect the range of distance by which the specimen may differ in length and still fit within the testing terminals.

The specimen terminals 24 and 26 may be of any preferred form in which the end of the specimen is gripped reliably, to permit the specimen to be stretched without danger of breaking at the terminal.

Near the terminal 24 the specimen carries a mount seen in the form of a sleeve 51 which is secured to the specimen so as reliably to travel with the specimen and carry with it the end 52 of the cord 40 for the purpose of showing the extent of movement of the specimen as indicated at the point of attachment of the cord end. The stretch of the specimen is evidence by the degree of rotation of the indicator drum.

A pin 53 is a very satisfactory means of attachment of the sleeve to the cord where the separation of the fibers of the specimen produced by the pin will not be objectionable. There are, of course, various other ways of attaching the cord which may be used. Another form is shown in Figure 13 for use when the specimen is too fine or too delicate to withstand pin attachment.

In Figure 13 there is shown a spring clip 54 such as is used for holding papers together. Its jaws may be clamped against the specimen for use in testing strands, threads, cords and smaller rope, using an intervening wrapping of rubber or fabric, for example such as seen at 55, if needed in order to protect the specimen. The drum operating cord may then be attached to the clip in any convenient manner to provide positive actuation of the cord and the drum in proportion to the elongation of the specimen.

The specimen terminal 26 may be of the same type as that at 24, again providing a connection which is stronger at the terminal than is the body of the specimen in order that the test may determine not only the elongation, including the elongation as the specimen nears its elastic limit, but also the breaking strength of the specimen.

Near the terminal 26 (that is, at the end nearer the indicator drum of the length of specimen intended to be tested) I secure another attachment, permissibly a second sleeve, 51' held by pin 53' or fastened by a catch, with or without protective covering such as catch 54 and covering 55.

In any suitable relation so as to travel with the second pin or other attachment I mount a cord guide or bearing about which the cord 40 turns and which is shown as an idler pulley 56. The cord 40 passes from the first point at which the cord is attached to the specimen (which is shown at the right in each of Figures 1 and 13) to a drum-turning connection 57 as directly and as free from friction as may be available. In the illustration the cord is guided by idler pulley 56, supported on the sleeve 51', 59 carried by a bracket 60, and 61 mounted upon or near the indicator drum.

In order that stretching of the specimen may not result in rotation of the end of the specimen about the specimen length as an axis, tightening or loosening the twist of a specimen, the pin 53' or other fastening used is kept from rotation and the idler guide pulley 56 is kept from turning about an axis through the length of the specimen (Figure 1) by the arm 62 rigid with the sleeve 51'. The arm 62 is pivoted to bracket 60.

In the apparatus first constructed by me I applied a thrust pressure to the indicator, as representing the stress upon the specimen, rather than the tension which would have been available directly in the pull upon the strap 27. I changed the tension into pressure by the proportioning lever 28 and brought the thrust upon the indicator piston rod from the end 63' of lever arm 63 of the proportioning lever 28 through yoke 64 and rod 65. The piston and its piston rod form a unit. It makes no difference, therefore, whether the rod passes through the piston so as actually to receive the thrust or whether the thrust is applied to the piston and through it to the rod.

The yoke is mounted upon the lever and is pivoted to it by a pin 66 retained at 67. The rod 65 is threaded into the U of the yoke, permitting threaded adjustment, and is locked in adjusted position by nut 68.

The normal indicator mounting has been modified and instead of the fluid mount upon a suitable valve, not shown, connected with an engine cylinder, by threads 69 of nut 70 and sealing taper surface 71, the indicator is supported through flange 72 of a bracket 73 by clamping tapered surface 71 rigidly on an externally threaded annular lip 74 having a corresponding internal taper 75. It will thus be seen that the indicator is self-aligning and rigidly mounted through pressures exerted by nut 70 and ball bearings 76. Bolts 77 secure block 78 to bracket 73. This is considered to be merely one mount of many possible forms of mounts. Block 78 carries a guide sleeve 79.

In Figure 1 the proportioning lever is pivoted at such a point that with the desired length of lever arm 23 and the anticipated stretch of the specimen, the total throw of rod 65 at the end of the stretch, and the consequent extension (in this case) or compression (Figure 9) of the indicator spring shall yield a full stylus movement along the length of the recording drum.

In the selection of the relative lengths of the lever arms of the proportioning lever, lever arm 63 must provide adequate throw of the yoke carried by this lever arm for the planned swing of lever arm 41, and a strength of spring 33 should be selected appropriate for the strength and resistance to stretch of the specimen being tested just as in forming indicator cards for a fluid pressure engine, the spring would be changed to suit the pressure developed. These relations are easily determined by trial tests.

Keeping in mind the relative locations in which the parts have been illustrated in Figure 1, proportioning lever 28 is rotated counterclockwise in that figure about pivot 29 by stress upon the specimen due to clockwise movement of lever 41, and proportioning lever 28 is guarded against excessive movement in a clockwise direction (such as would take place if the specimen break) by a guard 80.

Since the yoke-carrying proportioning lever swings the yoke at its pivot pin about the arc of a circle, the direction of thrust of the rod 65 is progressively variant. On the other hand it is quite desirable to have the piston rod urged directly in line with its axis and free from disturbing binding or friction due to diagonal stress.

The variant directions of yoke pressure have been taken care of by dividing up the thrust connection from the yoke to the piston rod (whether this thrust be directly against the rod or through the piston attached to the piston rod). The intermediate part or parts of the thrust train are separately guided and the thrust of rod 65 and an intermediate rod between it and the piston rod, is applied directly at the center of the guided rod ahead of it. I find that a single intermediate rod is sufficient and use the piston of the indicator as a guide for the piston rod, supported as it is laterally by the walls of the cylinder 81.

Since the piston is no longer used for piston purposes the capacity for putting in larger or smaller cylinders or pistons to accommodate different pressures while maintaining related or equal stylus movement has no function.

Since the piston is viewed chiefly as a guide, the piston and the piston end of the piston rod as a thrust unit find their chief value in straightening out the thrust which is to direct the piston rod along the axis of the rod.

It makes no difference whether the thrust rod which bears upon the piston unit engages the piston rod directly, where the piston rod extends through the piston, or engages a piston where the rod does not. The piston rod and piston function as an additional guided thrust rod.

In the thrust train which is illustrated the yoke rod 65 bears upon the center of the rear of an intermediate thrust rod 82 which is guided at 83 in the sleeve 79 and the front end of thrust rod 82 bears at the center upon the rear of the piston rod unit guided by the piston.

There is an advantage in using a pressure joint which is as free from friction as possible in case of relatively movement between the parts. The connections are made by pin bearing ball and socket at 84 and 85, one part offering the ball and the other the recess or socket.

It will thus be seen that the thrusts of yoke rod 65 through intermediate thrust rod 82 and the piston rod are guided and centered by the guides for the rear ends of the rods. The yoke as a guide lacks exact alignment as the pivot of the yoke moves through an arc; and this is corrected, to reduce friction, by the ball and socket connections between the parts.

In order to make the plunger quickly responsive without delay due to air entrapment the spaces are vented at 81' and 83'.

The indicator shown is intended to be any type of indicator that is capable of being mounted so that its piston may be operated, not by fluid under pressure, but by the thrust or tension (see Figures 1 and 8) due to stress upon the specimen tested. It is intended to transmit as faithfully as possible to the piston rod the pull exerted upon the specimen, to turn the card-carrying indicator drum in proportion to the stretch of the specimen and to use the normal pencil motion connections with the piston rod properly to operate a writing stylus over the drum.

Most engine indicators operating by fluid pressure have the makings of the instrument intended to be used here, namely, the piston rod, the piston, some connections between the piston rod and a stylus adapted to trace a line over the card, a spring opposing movement of the piston through opposition to movement of its rod, a drum upon some form of shaft opposed in rotation by a spring, or counterweight and cord, and a cord for drum operation, which in my invention becomes the cord which is pulled as the specimen is elongated.

The parts of an indicator illustrated are, therefore, not intended to be specific to any particular indicator though one type of "Maihak" indicator is shown in the main illustration.

My invention contemplates insertion of proportioning levers having different arm relations and substitution of different springs in the indicator mechanism, according to the strength of pull intended to be applied to the specimen for the purpose of ensuring that the indicator "card" secured is large enough and properly proportioned for convenient and accurate interpretation of the stress and strain involved.

The swing of the writing stylus is interpreted as stress and the extent of rotation of the card-carrying drum as strain so that the cards produced are capable of comparison with cards of other tests, directly or in some proportion which takes account of calibrated differences in spring response to pressure (Figure 4) or tension (Figure 8) and appropriately considers differences in length and elongation of specimens tested.

The piston rod 31 is guided at 84 at a distance from the piston and within spring carrier 85. The pencil movement and spring carrier are demountable from the complete instrument.

The spring carrier 85 and its retaining mechanism afford a base upon which the pencil movement is mounted. Without intending to suggest that the pencil carrier shown need be used, but considering it also as one of a type, I have shown the "Maihak" pencil indicator including coupling pin 86, link screw 87, coupling link 88, back link 89, front link 90, post 91 for front link and pencil arm 92 connected to move the stylus 93 in a straight line.

In Figure 4 the bracket 94 carrying the drum is removably attached to an exterior surface 95 of the indicator frame by means of screw 96 and is guided to proper position at 97. The drum with its spring is removably secured to the bracket by thread 98 and winged nut 99. A stop 100 resets the drum to its zero point.

Relative lengths of the levers and position of the pivot as well as the actual lengths of the levers in the proportioning lever will be determined by the special conditions of intended use. A few different levers have been shown. For instance, at 28' in Figure 3 a longer lever throw is provided for a lever which is connected by a thrust rod with a pressure train corresponding in its ultimate connections generally with the structure of Figure 4.

In Figure 7 the same lever 28 is used for tension connections as shown also in Figure 8.

In Figure 10 a proportioning lever $28^2$ having approximately the same general proportions as that of 28 is used to eliminate variations in the direction that the tension is applied to the piston rod which might be present in the form of Figure 7.

In Figure 12 the upper leverage is short and the lower leverage is long in a proportioning lever intended to be used with different spring adjustment and connections to a rotatable drum where the fiber tested is weak and the relative elongation is great.

The different proportioning levers shown are by way of example only and to indicate that this is an intermediate connection usable in any of the forms and capable of adjusting an apparatus to accommodate all sorts of special conditions of testing.

In Figure 7 a testing layout corresponding very generally with Figure 1 is connected so that the lever arm 63 of proportioning lever 28 pulls at the outer end of the piston rod instead of pushing at the inner end. Permissibly the same yoke as is shown in Figure 1 performing thrust rod functions is here turned the opposite way so that in response to the same counterclockwise movement of proportioning lever 28 it pulls through suitable connections seen in Figure 8 upon an eye 101 affixed in the outer end of the piston rod.

As will be obvious the effect in compression of the spring 33 is the same whether there be thrust at the piston end of the rod or pull at the outer end of the rod.

It is still very desirable to reduce friction by insuring that the pull is directly in the line of the axis of the piston rod so as to avoid side strain and excessive friction. In Figures 10 and 11 one means of accomplishing this is presented. The upper peripheral end of lever $28^2$ is shaped in the arc of the circle about fulcrum 29 as the center and a band 102 is connected as at 103 with the edge of the lever so that this arc affords a track placed just outside of the axis of the piston rod with the effect that the band 102 moves directly in the axis of the piston rod.

A common form of hook 104 is fastened to the band and passed through the eye 101 to complete the connection.

When the tension form of Figure 8 is used the thrust connections of Figure 4 are unnecessary but it is still necessary to guide the piston rod at the piston end; and the piston affords an excellent guide.

In order to further indicate the fact that the present invention is independent of variations in type of fluid pressure indicator which may be used there is illustrated in Figure 9 a very old type of compression spring indicator taken from Thompson Patent No. 167,364, of August 31, 1875, and modified to the extent only that, (a) a mount different than the tubular thimble of the patent is shown; (b) the piston and piston rod unit, accessible, at the lower end, are connected by a guided thrust rod with an outside thrust rod similar to the structure of Figure 4 in this respect; and (c) the upper end of the piston rod as extended shows an eye by which the piston rod can be pulled instead of being pushed.

The casing 105 supports a cylinder 106 enclosing piston 107, the movement of the piston compresses spring 108 and an extension of the piston rod at 109 connects with a pencil motion 110 to operate a stylus 111 over a drum 112 with drum operation at 113 as in the patent. The eye 114 has been added.

As showing very general suitability of fluid pressure indicators for operation by mechanical urge instead of fluid pressure upon their pistons and in particular as showing that in the existing forms the fluid side of the piston and piston rod unit is accessible from the outside for such a purpose reference is made to the following patents:

Calkins No. 442,102; Houghtaling No. 646,700; Doran et al. No. 655,857; Bosworth No. 687,391; Dobbie No. 689,640; and Davidson No. 713,611.

Having thus described my invention what I claim as new and desire to secure by Letters Patent is:

1. In an indicator for test purposes, as a subcombination, an operating rod, a mount for the rod, a rod guide, a spring connected with the rod and against whose resistance the rod moves, a cylinder in which the rod is movable, the rod and guide operating as a piston and rod unit in said cylinder, the unit being open to the atmosphere, a thrust rod having universal joint connection with the piston and rod unit, a guide for the thrust rod, tension transmitting mechanism having an anchorage for the specimen tested, and thrust connections from the anchorage with the guided end of the thrust rod to operate the piston by mechanical means against the resistance of the spring.

2. In tension testing apparatus for testing specimens, a rod, a spring adjacent one end of the rod for opposing movement of the rod, a pencil movement operated by one end of the rod, a drum for the pencil movement, means for turning the drum in proportion to the stretch of the specimen, a guide unit for the rod at the end farther from the spring, to prevent lateral movement, a thrust rod, a guide for the thrust rod near the end further from the guide unit, a second thrust rod connecting with the first thrust rod, and tension-operated thrust mechanism for pressing the second thrust rod longitudinally in proportion to the tension exerted upon the specimen.

3. An indicator for use in drawing a tension diagram representing the results of tension test upon a specimen adapted to be stretched, comprising a mount, a cylinder supported by the mount, a piston unit including a piston rod guided within the cylinder, a spring connected with the piston rod and resisting movement of the piston rod, a pencil movement connected with the piston rod, a record carrier movable in a direction generally perpendicular to the traverse of the pencil movement, tension means for moving the record carrier in response to the stretch of the specimen tested and mechanical means for moving the piston unit longitudinally of the piston rod including guided thrust rod connections engaging in series with the piston unit through universal joints whereby lateral strain of the piston in the cylinder is reduced.

4. In a testing mechanism for showing the characteristics of a fiber under tension, stress recording mechanism including a guided rod, a guide for said rod, a spring opposing movement of the rod, a pencil movement operated by the guided rod and a resiliently retracted record-carrying drum over which a pencil of said movement operates to form a record, a testing lever, a mount therefor, holders for the two ends of the fiber specimen, the one holder connected with the lever, a proportioning lever connected with the second holder for the fiber, the proportioning lever having arms proportioned so that the maximum displacement of the pencil caused by the force applied to the specimen registers within the length of the drum and a cord connecting the drum and specimen to operate the drum by reason of and in proportion to the stretch of the specimen.

5. In test apparatus, the combination of means for applying force to a specimen including a lever, a pivot for said lever, and a terminal for the specimen connected to the lever; means for making a record of the force applied to the specimen including an engine indicator having a mount, a spring loaded rod and a pencil recorder mechanism operating in response to displacement of said spring-loaded rod; and means for transmitting the force applied to the specimen to the indicator including a specimen terminal, a proportioning lever, a pivot for said proportioning lever, connections between the terminal and the proportioning lever, and connections between the proportioning lever and the indicator whereby the rod is displaced in response to force applied to the specimen.

6. Apparatus according to claim 5 in which the connections between the proportioning lever and the indicator operate to pull the rod.

7. Apparatus according to claim 5 in which the connections between the proportioning lever and the indicator operate to push the rod.

8. In recording test apparatus, an operating rod having a guide, a mount for the rod and guide, a spring connected with the rod and against whose resistance the rod moves, a cylinder in which the rod is movable, the rod and guide operating as a piston and rod unit in said cylinder, the unit being open to the atmosphere, a tension transmitting mechanism having an anchorage for the specimen tested, guided thrust connections engaging the rear of the piston rod unit to push the unit and force proportioning means between the anchorage and the connections, idicating means for the force upon the unit and indicating means acting at right angles to the first indicating means, showing the strain of the specimen.

9. In a stress-strain recorder, a force applying lever having long and short arms, a pivot therefor, a specimen terminal connected with the short lever arm, a second specimen terminal for the other end of the specimen, a proportioning second lever, a pivot therefor, connections between the second specimen terminal and one arm of the second lever, a recording mechanism of steam engine indicator type having a guided rod, connections between said second proportioning lever and said rod, a spring opposing movement of the rod, a pencil mechanism and pencil carried thereby connected to said rod, a rotatable drum over which the pencil operates, and a cord connected with the drum to rotate the drum, and connected with the specimen whereby elongation of the specimen is evidenced by turning of the drum and force is evidenced by movement of the pencil.

10. In mechanism for testing the stress and strain upon a stretched specimen, means for bringing tension upon one end of the specimen, and anchorage for the other end of the specimen, a proportioning lever to which the anchorage is connected, a rotatable card-carrying drum, a cord connected with the drum and to the specimen by which the distance of the stretch is evidenced in rotation of the drum, a guided rod pulled by the proportioning lever, one end of which is directly in line with the axis of the rod, a guide for said rod, a spring opposing movement of the rod, a pencil motion operated by the rod and retracting means for the drum.

11. The apparatus set forth in claim 9 in which the connections between the piston rod and the second proportioning lever are mechanical thrust connections.

12. The apparatus set forth in claim 9 in which the connections between the rod and the second proportioning lever are mechanical tension connections.

WALTER HANS SETZ.

REFERENCES CITED

The following references are of record in the file of this patent:

UNITED STATES PATENTS

| Number | Name | Date |
|---|---|---|
| 631,540 | Henning | Aug. 22, 1899 |
| 2,066,311 | Appel et al. | Jan. 5, 1937 |
| 450,989 | Calkins | Apr. 21, 1891 |
| 1,508,249 | Potter | Sept. 9, 1924 |
| 1,695,046 | Hippensteel | Dec. 11, 1928 |
| 1,779,992 | Stump et al. | Oct. 28, 1930 |
| 67,144 | Stannard | July 23, 1907 |
| 2,063,169 | Kemler | Dec. 8, 1936 |

FOREIGN PATENTS

| Number | Country | Date |
|---|---|---|
| 47,007 | German | May 1, 1889 |
| 31,891 | German | June 15, 1885 |
| 587,424 | German | June 14, 1933 |
| 4,158 | Swiss | Nov. 23, 1891 |